United States Patent [19]

DiLuccio

[11] 4,416,942

[45] Nov. 22, 1983

[54] LAMINATES OF LAMELLAR ARTICLES AND POLYOLEFINS

[75] Inventor: Robert C. DiLuccio, Wilmington, Del.

[73] Assignee: E. I. Du Pont de Nemours & Co., Wilmington, Del.

[21] Appl. No.: 380,769

[22] Filed: May 21, 1982

[51] Int. Cl.³ .................... B32B 27/08; C08L 23/00
[52] U.S. Cl. .................................. 428/332; 428/412; 428/474.7; 428/476.9; 428/483; 428/910; 428/516; 428/520; 264/234; 264/515; 525/179
[58] Field of Search .................. 428/516, 332, 476.9, 428/474.7, 483, 520, 910

[56] References Cited

U.S. PATENT DOCUMENTS

| | | | |
|---|---|---|---|
| 3,093,255 | 6/1963 | Mesrobian et al. | 215/1 |
| 3,373,222 | 3/1968 | Armstrong | 260/857 |
| 3,373,223 | 3/1968 | Armstrong | 260/857 |
| 3,373,224 | 3/1968 | Mesrobian et al. | 260/857 |
| 3,435,093 | 3/1969 | Cope | 260/857 |
| 3,639,527 | 2/1972 | Brinkman et al. | 260/873 |
| 3,857,754 | 12/1974 | Hirata et al. | 161/227 |
| 3,873,667 | 3/1975 | Preto et al. | 264/234 |
| 3,975,463 | 8/1976 | Hirata et al. | 260/897 |
| 4,151,318 | 4/1979 | Marshall | 428/516 X |
| 4,309,465 | 1/1982 | Kornbaum | 428/35 |

FOREIGN PATENT DOCUMENTS

| | | |
|---|---|---|
| BE884922 | 12/1980 | Belgium . |
| BE886134 | 5/1981 | Belgium . |
| 41747 | 12/1981 | European Pat. Off. . |
| 2746181 | 11/1978 | Fed. Rep. of Germany . |
| 56-058862 | 5/1981 | Japan . |

Primary Examiner—P. Ives

[57] ABSTRACT

A laminate of a first layer of a lamellar heterogeneous blend of a polyolefin and a condensation polymer incompatible with the polyolefin, and a second layer of a polyolefin, said layers being melt bonded together.

12 Claims, No Drawings

LAMINATES OF LAMELLAR ARTICLES AND POLYOLEFINS

BACKGROUND OF THE INVENTION

The subject invention relates to the melt bonding together of a polyolefin layer with a layer of a lamellar, heterogeneous blend of polyolefin and a condensation polymer incompatible with the polyolefin, to form a laminate.

As detailed in U.S. Ser. No. 241,051 filed Mar. 4, 1981, a process and product therefrom is known for manufacturing a lamellar, shaped article of polymeric material comprising the steps of establishing a melted, heterogeneous blend of a base polyolefin, a condensation polymer incompatible with the base polyolefin, and an alkylcarboxyl-substituted polyolefin; and forming the melted blend by stretching a body of the melt and cooling the stretched body to below the melting point of the lowest melting polymer component. The fluid barrier properties of an article made thereby are reported to be superior to the fluid barrier properties of prior art articles formed from homogeneous blends of similar components.

SUMMARY OF THE INVENTION

The subject invention provides a laminate of a first layer of a lamellar, heterogeneous blend of a polyolefin and a condensation polymer incompatible with the polyolefin as detailed in Ser. No. 241,051, and a second layer of a polyolefin, said layers being melt bonded together. Surprisingly, this laminate exhibits substantial improvement in the fluid barrier properties of a single layer of the product of Ser. No. 241,051 with comparable condensation polymer content.

More specifically, the subject invention provides an at least two layer laminate film having a first layer of a polymer comprising a base polyolefin, a condensation polymer incompatible with the base polyolefin, and an alkylcarboxyl-substituted polyolefin wherein the base polyolefin, and the condensation polymer are present in the article as thin, substantially two-dimensional, parallel and overlapping layers of material and the alkyl-carboxyl substituted polyolefin is present between these layers and adheres them together; and a second layer of a polyolefin, this second layer comprising 10 to 90 percent of the thickness of the laminate; said layers being melt bonded together such that the molecular networks of the first and second layers at the lamination site are adhered together.

DETAILED DESCRIPTION

The first layer of the laminates of the subject invention consists of the polymer products fully detailed in U.S. Ser. No. 241,051. These products, generally, are lamellar shaped articles made from a mixture of two incompatible polymers and one polymer which serves to adhere together adjacent domains of the incompatible polymers. The products are made by mixing together particles of the polymers, heating the mixture to yield a heterogeneous melt of material, and forming the melt in a way which results in stretching the melt to yield an elongated discontinuous polymer phase.

In one embodiment, in accordance with Ser. No. 241,051, the polymer particles, in unmelted form, are mixed thoroughly so as to provide a statistically homogeneous distribution and care must be exercised to avoid substantial additional mixing after the polymers have been heated to a melt. In another embodiment, the polymer particles can be combined in softened or molten form so long as the combination of polymers maintains a heterogeneous character. The blend can also be established by combining the polymers at a temperature such that one of the polyolefin or the condensation polymer is not softened or molten and then heating the combination. The preparation of the product depends on establishing a melted heterogeneous blend of incompatible polymers so that, when the melt is stretched at temperatures above the melting point of the highest melting polymer component, such as by extrusion forces, one polymer is in the form of a continuous matrix phase and another polymer is in the form of a discontinuous distributed phase. The polymer comprising the discontinuous phase is present as a multitude of thin, substantially two dimensional, parallel and overlapping layers embedded in the continuous phase.

Also necessary for the preparation of the product of Ser. No. 241,051 is a polymer which adheres together adjacent layers or domains of the incompatible polymers. In view of its believed purpose, that polymer can be termed a compatibilizer although the purpose of that polymer is not to compatibilize in the sense of making the polymers in the blend homogeneous. It is believed that at least some of the compatibilizer is concentrated between the adjacent layers of incompatible polymer joined partially with one layer and partially with an adjacent layer, thus adhering the layers together. For the purposes of this invention, "incompatible polymers" mean polymeric materials which have substantially no mutual miscibility in the melt form.

Although it is not required, it is preferred that the condensation polymer used be in particulate form; and it is desired that both the polyolefin and the condensation polymer should be mixed as particles. The particles should, as a general rule, be of a size such that the molten blend of incompatible polymers, when introduced to some melt stretching means, such as extrusion die lips, exhibits the heterogeneity necessary for production of the product of Ser. No. 241,051. When the particles, especially particles of the condensation polymer, are of too small a size, the melted blend, even though not excessively mixed, tends to function as a homogeneous composition because the domains of material making up the discontinuous polymer phase are so small. When the particles, especially particles of the condensation polymer, are of too large a size, the melted blend tends to form into shaped articles having a marbleized structure rather than a laminar structure, the large domains of the materials which would make up the discontinuous phase thereby extending to opposite boundaries of the shaped articles and causing disruption of the material which would make up the continuous phase. The particles are preferably generally regular in shape, such as cubical or spherical or the like. The particles may, however, be irregular; and they may have one dimension substantially greater than another dimension such as would be the case, for example, when flakes or fibers of material are used.

When each of the incompatible polymers is present as individual particles, the particles are generally of approximately the same size although such is not required. The compatibilizer can be provided by itself as individual particles or it can be mixed into, coated onto, or otherwise combined with some or all of one or both of the incompatible polymers.

In the product of Ser. No. 241,051, the thickness of the layers of material in the discontinuous phase is a function of the particle size combined with the degree of stretching in the forming step. The particle size of the polymer which will be the discontinuous phase is generally selected with a view toward resulting, after stretching the melt, in overlapping layers, or lamellae, which can be from about 0.5 to 50 micrometers thick and perhaps sometimes slightly thicker.

Mixing particles of polymers can be accomplished by any well-known means such as by means of a vee-blender or a tumble mixer or, on a larger scale, by means of a double-cone blender. Continuous mixing of the particles can be accomplished by any of several well-known methods. Of course, the particles can also be mixed by hand; —the only requirement of the mixing being that any two statistical samplings of the mixture in a given mass of material should yield substantially the same composition. The mixing of the incompatible polymers can be accomplished by adding particles of the higher melting polymer to a melt of the lower melting polymer maintained at a temperature below the higher melting point. In that case, the melt is agitated to obtain an adequate mixture; and the mixture is, thus, ready for the heating step.

Once mixed, the incompatible polymers are heated to a temperature greater than the melting point of the highest melting polymer component. It is noted that the heating is conducted for the purpose of stretching the softened or melted blend. In the case of an incompatible polymer which exhibits no well-defined melting temperature, "melting temperature," as used here, refers to a temperature at least high enough that the polymers have been softened to the degree required to stretch each of the polymers in the blend. That heating results in a softened or melted heterogeneous blend of materials. The heating must be conducted in a manner which avoids substantial additional mixing of the incompatible polymers because such mixing could cause a homogenization and combination of the melted particles and could result in a melt of homogeneous, unlayered composition. The heating can be conducted by any of several well-known means and is usually conducted in an extruder. It has been learned that a single-screw extruder, for example, one of the type which is designed for material transport and not material mixing, can be used between the heating and forming steps without causing homogenization of the two phase incompatible polymer composition. Low shear and low mixing extruders of the kind normally used for polyvinyl chloride, acrylonitrile, or polyvinylidene chloride can be used if they are used in a way to melt and transport the materials and minimize mixing of the components. High shear and high mixing extruders of the kind normally used for nylon and polyethylene cannot, generally, be used.

In order to form the product of Ser. No. 241,051, the melt is stretched and then cooled. Stretching is an elongation of the two phase melt to cause a substantial change in the dimensions of the particles in the discontinuous phase. Stretching in the melt phase can be accomplished by any of several means, or by a combination of more than one such means. For example, the melt can be stretched by being squeezed between rollers or pressed between platens or extruded between die lips. Molding processes such as blow molding also cause stretching in accordance with this process. In the manufacture of containers as shaped articles, this stretching can be accomplished by a combination of extruding a blend of the heterogeneous melt to yield a container preform or parison followed by blow molding the melt parison into a finished container.

The stretching of Ser. No. 241,051 can be carried out in one direction or in perpendicular directions, at a temperature above the melting temperature of the highest melting polymer component. Whether the stretching is conducted in one direction or two, there should be an elongation of from 100 to 500 percent in at least one direction; and an elongation of from 100 to 300 percent is preferred. While the upper limit set out herein is not critical, the lower limit is critical insofar as inadequate stretching does not form the condensation polymer into lamellae.

Stretching is followed by cooling to below the temperature of the melting point of the lowest melting component to solidify the shaped article. The cooling can be conducted by any desired means and at any convenient rate. In the case of stretching by blow molding, the mold is often chilled to cool the article; and, in the case of extruding a film, cooling can be accomplished by exposure to cool air or by contact with a quenching roll.

As to the proportions of the components for production of the Ser. No. 241,051 article, the incompatible condensation polymer which is to be a discontinuous phase in the shaped articles should be present in generally less than about 40 weight percent of the mixture. More specifically, it has been found that the incompatible condensation polymer should be present in more than about 5 weight percent and less than about 40 weight percent of the mixture and about 10 to 30 weight percent is preferred. In the case where polyester is the incompatible polymer, it has further been found that such can be present in amounts up to about 60 percent of the mixture. The polyolefin should be present in more than about 60 weight percent and less than about 95 weight percent of the mixture and 70 to 90 weight percent is preferred. The compatibilizer should be present in about 1 to 30 weight percent of the discontinuous phase and about 10 to 20 weight percent is preferred. Any of the components can be used to introduce inert fillers into the composition provided only that the fillers are not of a kind or in an amount which would interfere with formation of the layered construction or with the desired or required properties of the composition. Amounts of opacifiers, colorants, lubricants, stabilizers and the like which are ordinarily used in structural polymeric materials can be used herein. The amount of such filler is not included in the calculation of amounts of incompatible polymers and compatibilizers.

The polyolefins used in the composition of the Ser. No. 241,051 product include polyethylene, polypropylene, polybutylene, copolymers of those materials, and the like. Polyethylene is preferred and may be high, medium, or low density.

The condensation polymer, incompatible with the polyolefin, incudes polyamides, polyesters such as polyethylene terephthalate and polybutylene terephthalate and polycarbonates.

Polyamides and copolyamides are well known and are made by reacting carboxylic acids with primary amines under well-known conditions. Examples of carboxylic acids used in polyamide preparation are adipic acid, suberic acid, sebacic acid, azelaic acid, glutaric acid, pimelic acid, and the like. Examples of primary amines are tetramethylenediamine, pentamethylenediamine, hexamethylenediamine, octamethylenediamine, and the like. Exemplary polyamides include poly(pentamethylene adipamide), poly(hexamethylene adipamide), poly(hexamethylene sebacamide), polyamides obtained from lactams such as caprolactams and from amino acids such as 11-aminoundecanoic acid, and the like. Poly(hexamethylene adipamide) and polycaproamide are preferred.

Polyesters are well known and are made by reacting dibasic carboxylic acids with glycols under well-known conditions. Examples of carboxylic acids used in preparation of polyesters are terephthalic acid, isophthalic acid, and the like. Examples of glycols, ethylene glycol, butylene glycol, and other so-called polymethylene glycols having 2 to 10 methylene groups. Exemplary polyesters are poly(ethylene terephthalate), poly(butylene terephthalate), and the like. Poly(ethylene terephthalate) is preferred.

Polycarbonates are disclosed in the *Handbook of Common Polymers*, compiled by W. J. Roff and J. R. Scott, CRC Press, Cleveland, Ohio, U.S.A. (1971).

The alkylcarboxyl-substituted polyolefin compatibilizer is a polyolefin which has carboxylic moieties attached thereto, either on the polyolefin backbone itself or on side chains. By "carboxylic moiety" is meant carboxylic groups from the group consisting of acids, esters, anhydrides, and salts. Carboxylic salts are neutralized carboxylic acids and a compatibilizer which includes carboxylic salts as a carboxylic moiety also includes the carboxylic acid of that salt. Such compatibilizers are termed ionomeric polymers.

Compatibilizers can be prepared by direct synthesis or by grafting. An example of direct synthesis is the polymerization of an α-olefin with an olefinic monomer having a carboxylic moiety; and an example of grafting is the addition of a monomer having a carboxylic moiety to a polyolefin backbone. In the compatibilizer made by grafting, the polyolefin is polyethylene or a copolymer of ethylene and at least one α-olefin of 3-8 carbon atoms such as propylene, and the like, or a copolymer including at least one α-olefin or 3-8 carbon atoms and a diolefin, such as 1,4-hexadiene, and the like. The polyolefin is reacted with an unsaturated carboxylic acid, anhydride, or ester monomer to obtain the grafted polymer. Representative eligible acids, anhydrides, and esters include: methacrylic acid; acrylic acid; ethacrylic acid; glycidyl methacrylate; 2-hydroxy ethylacrylate; 2-hydroxy ethyl methacrylate; diethyl maleate; monoethyl maleate; di-n-butyl maleate; maleic anhydride; maleic acid; fumaric acid; itaconic acid; monoesters of such dicarboxylic acids; dodecenyl succinic anhydride, 5-norbornene-2,3-anhydride, nadic anhydride (3,6-endomethylene-1,2,3,6-tetrahydrophthalic anhydride); and the like. Generally, the graft polymer will have from about 0.01 to about 20, preferably abut 0.1 to about 10, and most preferably about 0.2 to about 5, weight percent graft monomer. Grafted polymers are described in greater detail in U.S. Pat. No. 4,026,967 and 3,953,655.

In the compatibilizer made by direct synthesis, the polymeric material is a copolymer of an α-olefin of 2-10 carbon atoms and an α,β-ethylenically unsaturated carboxylic acid, ester, anhydride, or salt having 1 or 2 carboxylic moieties. The directly synthesized compatibilizer is made of at least 75 mole percent of the olefin component and from about 0.2 to 25 mole percent of the carboxylic component.

Ionomeric compatibilizer is preferably made from directly synthesized compatibilizer and is preferably made up of about 90 to 99 mol percent olefin and about 1 to 10 mol percent α,β-ethylenically unsaturated monomer having carboxylic moieties wherein the moieties are considered as acid equivalents and are neutralized with metal ions having valences of 1 to 3, inclusive, where the carboxylic acid equivalent is monocarboxylic and are neutralized with metal ions having a valence of 1 where the carboxylic acid equivalent is dicarboxylic. To control the degree of neutralization, metal ions are present in an amount sufficient to neutralize at least 10 percent of the carboxyl moieties. Representative eligible α-olefins and unsaturated carboxylic acid, anhydride, and ester monomers are those previously herein described. Ionomeric polymers are described in greater detail in U.S. Pat. No. 3,264,272.

The compatibilizer is generally about 0.5 to 3.0 weight percent carboxylic component.

In making the first layer of the laminates of the subject invention in accordance with Ser. No. 241,051, the polyolefin is generally taken to provide the continuous phase and is used in an amount of about 60 to 95 weight percent of the total composition while the incompatible condensation polymer is taken to provide the discontinuous phase and is used in an amount of about 5 to about 40 weight percent of the total composition. Again, in the case where polyester is the incompatible polymer, up to 60 weight percent can be employed. The alkylcarboxyl-substituted polyolefin is used in an amount of about 0.5 to 5 weight percent of the total composition and more can be used, if desired.

The second layer of the laminates of the subject invention consists of polyolefins including polyethylene, polybutylene, copolymers of those materials and the like. Polyethylene is preferred and may be high, medium or low density. It is preferred that the polyolefin of the second layer of the laminates of the subject invention be the same as the base polyolefin in the first layer of the laminates of the subject invention and, in all cases, these two polyolefins must be capable of being melt bonded together. Like the components of the polymer of Ser. No. 241,051, this polyolefin can be used to introduce inert fillers into the composition such as opacifiers, colorants, lubricants, stabilizers and the like.

In one embodiment, the laminates of the subject invention can be produced by coextruding the second layer polyolefin with the first layer product of Ser. No. 241,051. In this embodiment, the product of Ser. No. 241,051 is formed in a first extruder as detailed above while, concurrently, the polyolefin is melt extruded through a second extruder of a type known in the art as useful for melt extruding polyolefins, generally having a screw with a 3:1 compression ratio.

As the two polymers are melted in their respective extruders, they are transported from a feed block or combining adaptor into a die where the two polymers, as coextruded layers, exit the die slot. The combining adaptor is adjusted so that the second polyolefin layer comprises 10 to 90 percent, more preferably 25 to 75 percent of the thickness of the laminate. After cooling, for example by extrusion onto a quench roll, the two layers of the laminate have molecular networks at the point of lamination which are adhered to one another.

Depending upon the die used in the coextrusion described above, laminates in film form can be produced, or shaped articles such as bottles can be formed, using extrusion techniques well known in the art.

In another embodiment, the laminates of the subject invention can be produced by pressing the first layer product of Ser. No. 241,051 together with the second layer polyolefin between heated platens of a hydraulic press above a temperature and pressure at which the layers can be melt bonded but below a pressure and a temperature at which the morphology of the lamellar structure is adversely affected. Generally, these temperatures range from above the maximum DSC melting point of the polyolefin and below the onset of the DSC melting point of the condensation polymer. If high density polyethylene and nylon 66 are used as the polyolefin and condensation polymer respectively, these conditions can range from below 150° C. at 100 MPa to below 200° C. at touch pressure. Again, after cooling, the two layers of the laminate have molecular networks that are adhered together at the point of lamination.

It may be apparent to those skilled in the art of polymer lamination that the melt bonding of the layers described above can be accomplished by other various methods. For example, the two layers, in film form, may be run together through heated nip rolls. In any event, so long as the layers are melt bonded together such that the molecular networks of the layers at the lamination site are adhered together, the benefits of the subject invention will be realized. This melt bonding allows scrap to be reworked by melting the scrap in the extruder used to form the product of Ser. No. 241,051.

Surprisingly, the laminates of the subject invention exhibit improved fluid barrier properties, especially to hydrocarbons, over those of a single layer of the product of Ser. No. 241,051 having comparable amounts of the condensation polymer therein. Further, the laminates of the subject invention also exhibit lower fluid barrier permeability than control samples where the first layer product of Ser. No. 241,051 and the second layer polyolefin are simply laid contiguously over one another but not melt bonded together. This fluid barrier improvement is evidenced regardless of the direction of fluid permeation, i.e., through the first layer of the product of Ser. No. 241,051 and then through the second layer of the polyolefin, or vice versa. The laminates of the subject invention may, of course, be uniaxially or biaxially stretched at least twice the original dimensions, at a temperature above the onset of the DSC melting point of the polyolefin and below the maximum of that DSC melting point, to further improve their fluid barrier permeability. In the case where the polyolefin is polyethylene, this temperature range is between 120° and 135° C.

The laminates hereinbefore described are of a single first layer of the product of Ser. No. 241,051 and a single second layer of a polyolefin. Of course, laminates having more than one layer of either or both of these above described layers can be produced so long as the polyolefin comprises 10 to 90 percent of the thickness of the laminate, and the layers are melt bonded together.

The attributes of the laminates of the subject invention will be more fully appreciated by reference to the examples that follow.

EXAMPLE I

The polymer used to form the first layer of a laminate was prepared in an extruder in accordance with Ser. No. 241,051 as follows:

The polyamide used was prepared by condensing hexamethylenediamine, adipic acid, and caprolactam to obtain a composition of 77.5 weight parts of poly(hexamethylene adipamide) and 22.5 weight parts of polycaproamide. That polyamide exhibited a DSC melting point of about 225° C.

The polyolefin used was a linear polyethylene having a density or 0.944 gram per cubic centimeter, a melt index of 0.24 g/10 min. as determined according to ASTM D-1238, a melting point of about 125° C., and is commercially available from E. I. du Pont de Nemours and Company under the trademark designation "Alathon" PE 7810. Particles of the polyamide and the polyethylene were generally cubical and were about 3-4 millimeters on each side.

The alkylcarboxyl-substituted polyolefin compatibilizer used was obtained by melt grafting fumaric acid onto polyethylene having a density of 0.958 gram per cubic centimeter and a melt index of about 10 g/10 min., as determined according to ASTM D-1238. The fumaric acid was grafted onto the polyethylene in an amount of about 0.9 weight percent based on the total weight of the polymer in accordance with the teaching of U.S. Pat. No. 4,026,967. Particles of the compatibilizer were generally cubical and were about 2-3 millimeters on a side. The material exhibited a melting point of about 135° C.

The following mixtures of polyolefin, polyamide, and compatibilizer, tabulated in weight percent based on mixture, were tumbled in a drum to achieve complete, even, particle distribution:

| Sample | % Polyolefin | % Polyamide | % Compatibilizer |
| --- | --- | --- | --- |
| 1 | 92 | 5 | 3 |
| 2 | 92 | 5 | 3 |
| 3 | 82 | 15 | 3 |
| 4 | 82 | 15 | 3 |
| 5 | 72 | 25 | 3 |
| 6 | 72 | 25 | 3 |
| 7 | 82 | 15 | 3 |
| 8 | 82 | 15 | 3 |

A portion of the mixture was fed directly into an extruder such as that sold by Killion of Pompano Beach, Fla., U.S.A., identified as a 1 inch Model KTS100 and equipped with a low mixing screw and a side-fed blown film die. The barrel temperature of the extruder graduated from 230° C. at the feed end to 265° C. at the exit end. The die was heated to 250° C. The extrusion rate of this extruder was 1.5-3.0 Kg/hr (4-8 lbs/hr).

A 1.5 inch Killion extruder Model KL150 with a conventional polyethylene screw design was adapted for coextrusion with the extruder forming the above detailed first layer of the laminate of the subject invention. High density polyethylene (M.I. =0.3 g/10 min) was fed through this polyethylene extruder, the barrel temperature of this extruder graduating from 205° C. at the feed end to 250° C. at the exit end. Again, the die temperature was 250° C. The extrusion rate of this extruder was 3.0-7.5 kg/hr (8-20 lbs/hr).

As the laminate of the two layers exited the die (the combining adaptor set such that the polyolefin second layer comprised 50 to 75 percent of the thickness of the laminate) the laminate was cast onto a roll having a temperature of 80° C. thereby cooling the laminate and melt bonding the layers together.

Film samples were cut from the laminate and tested for toluene permeability using glass jars with open metal caps, such as those used for food canning, by recording the initial weight of the test jar, film, and added toluene and then measuring the weight loss of toluene at approximately 2 day intervals over a 1-2 week test period. The film samples used were circular and measured about 38 cm² in area. In preparing the samples for permeation tests, the film was placed over the jar opening with an o-ring (about the same size as the jar cap) cut from 1.6 mm (1/16 in) thick neoprene rubber between it and the cap to insure a leak-proof seal.

All tests were conducted at room temperature, 21.1° C. The results were as follows (thicknesses are in mm):

TABLE I

| Sample | Thickness Polyolefin layer | Thickness total sample | g/cm²·mm (× 10²) Condensation Polymer | g·mm/cm²·day (× 10²) Permeability Rate |
|---|---|---|---|---|
| 1 | 0.24 | 0.48 | 0.28 | 0.22 |
| 2* | 0.24 | 0.48 | 0.28 | 0.19 |
| 3 | 0.23 | 0.30 | 0.41 | 0.18 |
| 4* | 0.23 | 0.30 | 0.41 | 0.16 |
| 5 | 0.23 | 0.30 | 0.69 | 0.05 |
| 6* | 0.23 | 0.30 | 0.69 | 0.04 |
| 7 | 0.18 | 0.36 | 0.83 | 0.16 |
| 8* | 0.18 | 0.36 | 0.83 | 0.16 |

*toluene diffusion first through polyolefin layer

EXAMPLE II

One layer each of a film produced in accordance with Ser. No. 241,051 with compositions as follows:

| Sample | % Polyolefin | % Polyamide | % Compatibilizer |
|---|---|---|---|
| 1 | 92 | 5 | 3 |
| 2 | 92 | 5 | 3 |
| 3 | 82 | 15 | 3 |
| 4 | 82 | 15 | 3 | and a film of polyethylene as per Example I, were laminated by placing the two layers between platens of a hydraulic press and heated to 135° C. for 30 seconds under about 100 MPa pressure. The permeability rates were as follows.

| Sample | Thickness Polyolefin layer | Thickness total sample | gm/cm²·mm (× 10²) Condensation Polymer | g·mm/cm²·day (× 10²) Permeability Rate |
|---|---|---|---|---|
| 1 | 0.23 | 0.46 | 0.42 | 0.21 |
| 2 | 0.23 | 0.46 | 0.42 | 0.20 |
| 3 | 0.20 | 0.41 | 0.69 | 0.18 |
| 4 | 0.20 | 0.41 | 0.69 | 0.13 |

COMPARATIVE EXAMPLE I

The permeability rates of single layers of the product of Ser. No. 241,051 with compositions as tabulated below were measured, the results also tabulated below:

| Sample | % Polyolefin | % Polyamide | % Compatibilizer |
|---|---|---|---|
| 1 | 96 | 3 | 1 |
| 2 | 96 | 3 | 1 |
| 3 | 91 | 8 | 1 |
| 4 | 91 | 8 | 1 |

| Sample | Thickness | g/cm²·mm (× 10²) Condensation Polymer | g·mm/cm²·day (× 10²) Permeability Rate |
|---|---|---|---|
| 1 | 0.43 | 0.26 | 0.34 |
| 2 | 0.43 | 0.28 | 0.34 |
| 3 | 0.36 | 0.83 | 0.21 |
| 4 | 0.36 | 0.83 | 0.21 |

COMPARATIVE EXAMPLE II

One layer each of a film produced in accordance with Ser. No. 241,051 with compositions as follows:

| Sample | % Polyolefin | % Polyamide | % Compatibilizer |
|---|---|---|---|
| 1 | 84 | 15 | 1 |
| 2 | 84 | 15 | 1 |
| 3 | 74 | 25 | 1 |
| 4 | 74 | 25 | 1 | and a film of the polyethylene as used in Example I, were placed contiguously over one another (not melt bonded) and secured in a test jar, also as per Example I. The permeability rates were as follows:

| Sample | Thickness Polyolefin layer | Thickness total sample | g/cm²·mm (× 10²) Condensation Polymer | g·mm/cm²·day (× 10²) Permeability Rate |
|---|---|---|---|---|
| 1 | 0.26 | 0.43 | 0.27 | 0.43 |
| 2 | 0.26 | 0.43 | 0.27 | 0.39 |
| 3 | 0.29 | 0.47 | 0.87 | 0.34 |
| 4 | 0.29 | 0.47 | 0.87 | 0.35 |

I claim:
1. An at least two layer laminate comprising:
   (a) a layer of a polymer comprising a base polyolefin, a condensation polymer incompatible with the base polyolefin, and an alkylcarboxyl-substituted polyolefin wherein the base polyolefin and the condensation polymer are present in the article as thin, substantially two-dimensional, parallel and overlapping layers of material and the alkyl-carboxyl substituted polyolefin is present between the layers and adheres the layers together, and
   (b) a layer of a polyolefin or polyolefin copolymer film, said layer comprising 10 to 90 percent of the thickness of the laminate;
said layers being melt bonded together such that the molecular networks of the layers at the lamination cite are adhered together.
2. The laminate of claim 1 wherein the polyolefin layer comprises 25 to 75 percent of the thickness of the laminate.
3. The laminate of claim 1 or 2 in the form of a shaped article.
4. The laminate of claim 1 or 2 in the form of a film.
5. The laminate of claim 1 wherein the condensation polymer is a polyamide.
6. The laminate of claim 2 wherein the condensation polymer is a polyamide.
7. The laminate of claim 1 wherein the condensation polymer is a polyester.
8. The laminate of claim 2 wherein the condensation polymer is a polyester.
9. The laminate of claim 1, 2, 5, 6, 7 or 8 wherein the base polyolefin in (a) is polyethylene.
10. The laminate of claim 9 wherein the polyolefin in (b) is polyethylene.
11. The laminate of claim 1, 2, 5, 6, 7 or 8 wherein the polyolefin in (b) is polyethylene.
12. The laminate of claim 10 stretched at a temperature between about 120° and 135° C.

* * * * *